United States Patent
Asai

(10) Patent No.: US 7,144,062 B2
(45) Date of Patent: Dec. 5, 2006

(54) VEHICLE SUN VISORS

(75) Inventor: Takashi Asai, Toyota (JP)

(73) Assignees: Kyowa Sangyo Co., Ltd., Toyota (JP); Shinwa Seiko Co., Ltd., Toyota (JP)

( * ) Notice: Subject to any disclaimer, the term of this patent is extended or adjusted under 35 U.S.C. 154(b) by 0 days.

(21) Appl. No.: 11/348,005

(22) Filed: Feb. 6, 2006

(65) Prior Publication Data

US 2006/0175862 A1 Aug. 10, 2006

(30) Foreign Application Priority Data

Feb. 10, 2005 (JP) ............................. 2005-034439

(51) Int. Cl.
*B60J 3/02* (2006.01)
(52) U.S. Cl. ................ 296/97.9; 296/97.12; 296/97.13
(58) Field of Classification Search ............... 296/97.1, 296/97.9, 97.12, 97.13
See application file for complete search history.

(56) References Cited

U.S. PATENT DOCUMENTS 5,280,988 A * 1/1994 Gute ........................ 296/97.9
5,498,056 A * 3/1996 Viertel et al. ............... 296/97.5
5,924,748 A * 7/1999 Zapinski ..................... 296/97.1
6,220,644 B1 * 4/2001 Tiesler et al. ............ 296/97.11
6,962,385 B1 * 11/2005 Wieczorek et al. ....... 296/97.11
2004/0066056 A1 * 4/2004 Mills et al. ................ 296/97.1
2005/0206187 A1 * 9/2005 Torii ....................... 296/97.13

FOREIGN PATENT DOCUMENTS

JP 2002-293136 10/2002

* cited by examiner

*Primary Examiner*—Jason Morrow
(74) *Attorney, Agent, or Firm*—Conley Rose, P.C.

(57) ABSTRACT

A vehicle sun visor includes a visor body, a horizontal rod mounted to the visor body, and a support arm. The support arm has a vertical rod and is rotatably mounted to a vehicle cabin ceiling. A bearing is mounted to one end of the vertical rod and rotatably receives the horizontal rod, so that the visor body can pivot about an axis of the vertical rod and can also pivot about an axis of the horizontal rod. A stopper mechanism prevents the visor body from moving in a first direction along the axis of the horizontal rod but permits the visor body to move in a second direction opposite to the first direction. The first direction is a direction used for inserting the horizontal rod of the visor body into the horizontal bore of the bearing.

15 Claims, 4 Drawing Sheets

VEHICLE SUN VISORS

This application claims priority to Japanese patent application serial number 2005-034439, the contents of which are incorporated herein by reference.

BACKGROUND OF THE INVENTION

1. Field of Invention

The present invention relates to vehicle sun visors, and in particular to vehicle sun visors having a visor body movable between a storage position and a front light-shielding position and also movable between the front light-shielding position and a side light-shielding position.

2. Description of the Related Art

A known sun visor has a substantially L-shaped support rod that includes a vertical rod portion. The vertical rod portion is pivotally mounted to a bracket that is attached to a ceiling of a vehicle cabin. The vertical rod portion can pivot about its axis relative to the bracket. The support rod also has a horizontal rod portion that is rotatably inserted into a support member (i.e., a bearing) disposed within a corner portion of a visor body, so that the visor body can pivot about the horizontal rod portion.

Therefore, as the visor body pivots about the horizontal rod portion of the support rod, the visor body can move between a storage position along the vehicle cabin ceiling and a front light-shielding position along a front windshield of the vehicle. In addition, as the visor body pivots about an axis of the vertical rod portion, the visor body can move between the front light-shielding position and a side light-shielding position along a side window.

When the visor body is positioned at the side light-shielding position, one end of the horizontal rod portion, the end opposite to the vertical rod portion, may be oriented rearward with respect to the vehicle. Therefore, in the event that an external force is applied to the visor body to move the visor body rearward, the visor body may potentially be accidentally removed from the horizontal rod portion of the support rod.

For example, if a curtain-type airbag disposed on a lateral side of the vehicle cabin ceiling has been fully inflated and deployed, the inflated airbag may produce a force that urges the visor body rearward.

For this reason, Japanese Laid-Open Patent Publication No. 2002-293136 proposes to provide an engaging portion. The engaging portion extends from the outer peripheral surface of the horizontal rod portion of the support rod. In addition, the publication proposes to mount a removal-preventing member to the support member disposed within the visor body. The removal-preventing member is able to engage with the engaging portion of the horizontal rod portion. With this arrangement, the visor body may be prevented from being accidentally removed from the rear of the horizontal rod portion of the support rod.

However, this arrangement requires an engaging portion formed on the horizontal support rod and a removable preventing member mounted to the support member. Therefore, this arrangement may increase the number of components and the manufacturing cost of the vehicle sun visor.

SUMMARY OF THE INVENTION

It is accordingly an object of the present invention to teach improved techniques for preventing the accidental removal of a visor body from a support rod by utilizing a minimum number of components.

In one aspect of the present teachings, vehicle sun visors are taught that may include a visor body, a bracket for mounting the visor body to a vehicle cabin ceiling, and a support arm having a vertical rod. The vertical rod may be rotatably mounted to the bracket, so that the support arm can pivot about the axis of the vertical rod. In addition, the sun visors may include a horizontal rod and a bearing. The horizontal rod is disposed on one of the support arm and the visor body. The bearing is disposed on the other of the support arm and the visor body. The bearing defines a horizontal bore so that the horizontal rod may be rotatably inserted into the horizontal bore. With this arrangement, the visor body can pivot about the axis of the horizontal rod between a storage position, along the vehicle cabin ceiling, and a front light-shielding position along a front windshield of a vehicle. In addition, the visor body can pivot about the axis of the vertical rod between the front light-shielding position and a side light-shielding position along a side glass of the vehicle. The sun visors may further include a stopper formed on the visor body. The stopper may contact with the support arm in order to prevent the visor body from moving rearward, opposite to a direction for inserting the horizontal rod into the horizontal bore of the bearing, along the axis of the horizontal rod when the visor body is in the side light-shielding position.

Therefore, even when the visor body is in the side light-shielding position and an event, having an external force, has urged the visor body rearward, the bearing and the horizontal rod may be held and fitted to each other. As a result, the accidental removal of the visor body from the support arm may be reliably prevented.

In addition, it is not necessary to provide a dedicated separate stopper and to assemble the same into the visor body because the stopper is formed on the visor body in order to prevent the visor body from being unintentionally removed from the support arm.

In one embodiment, the bearing is integrally formed with the support arm. Additionally, the horizontal rod is integrally formed with the stopper of the visor body and extends substantially horizontally there from.

With this arrangement, the visor body has no separate bearing mounted within the visor body. Therefore, the visor body may have a relatively simple construction and can be easily manufactured.

DETAILED DESCRIPTION OF THE INVENTION

Each of the additional features and teachings disclosed above and below may be utilized separately or in conjunction with other features and teachings to provide improved vehicle sun visors and methods of manufacturing such sun visors. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

First Representative Embodiment

Figure 1:
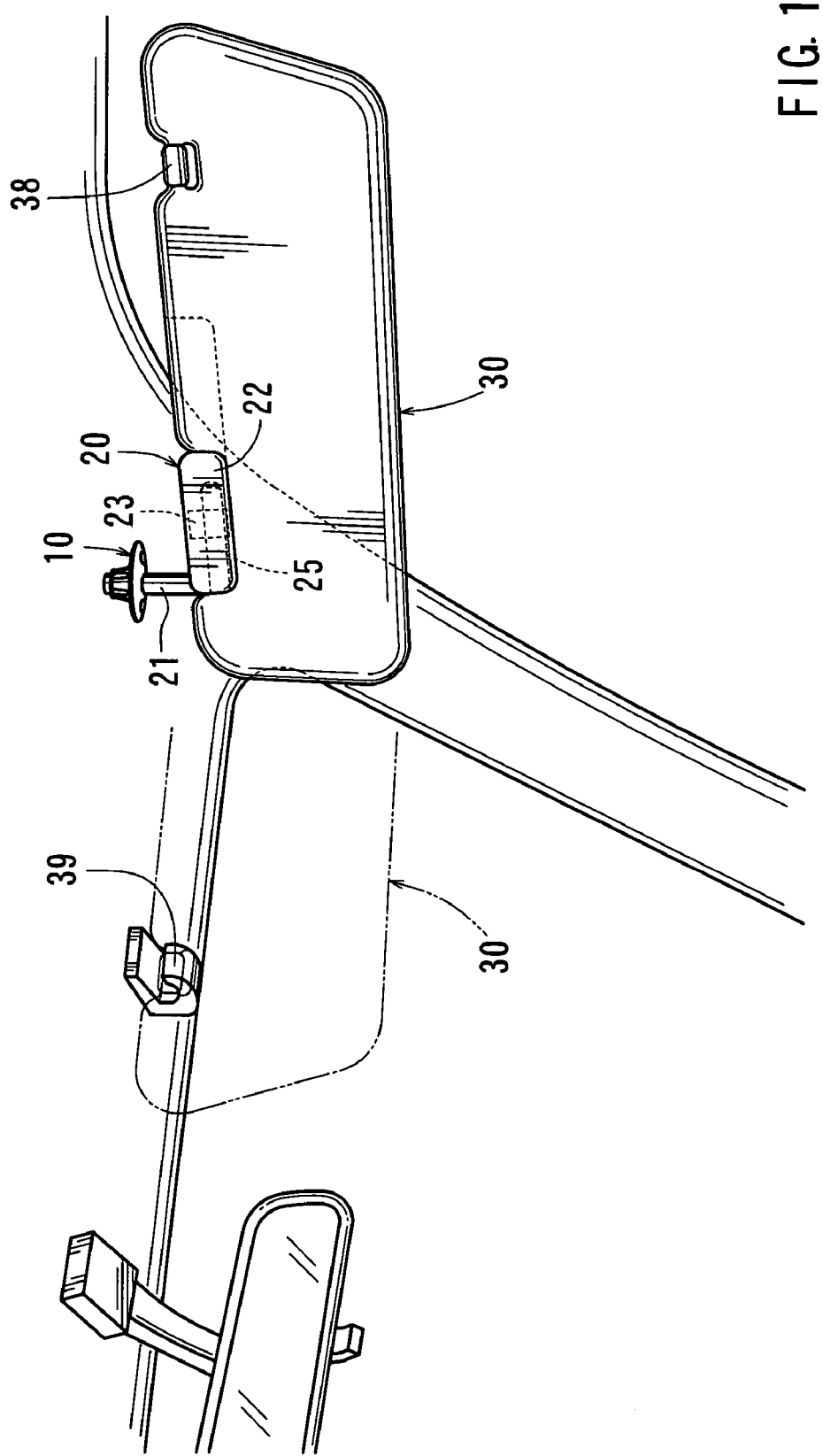
FIG. 1 is a schematic view of a first representative vehicle sun visor and showing a visor body in a side light-shielding position.
Figure 2:
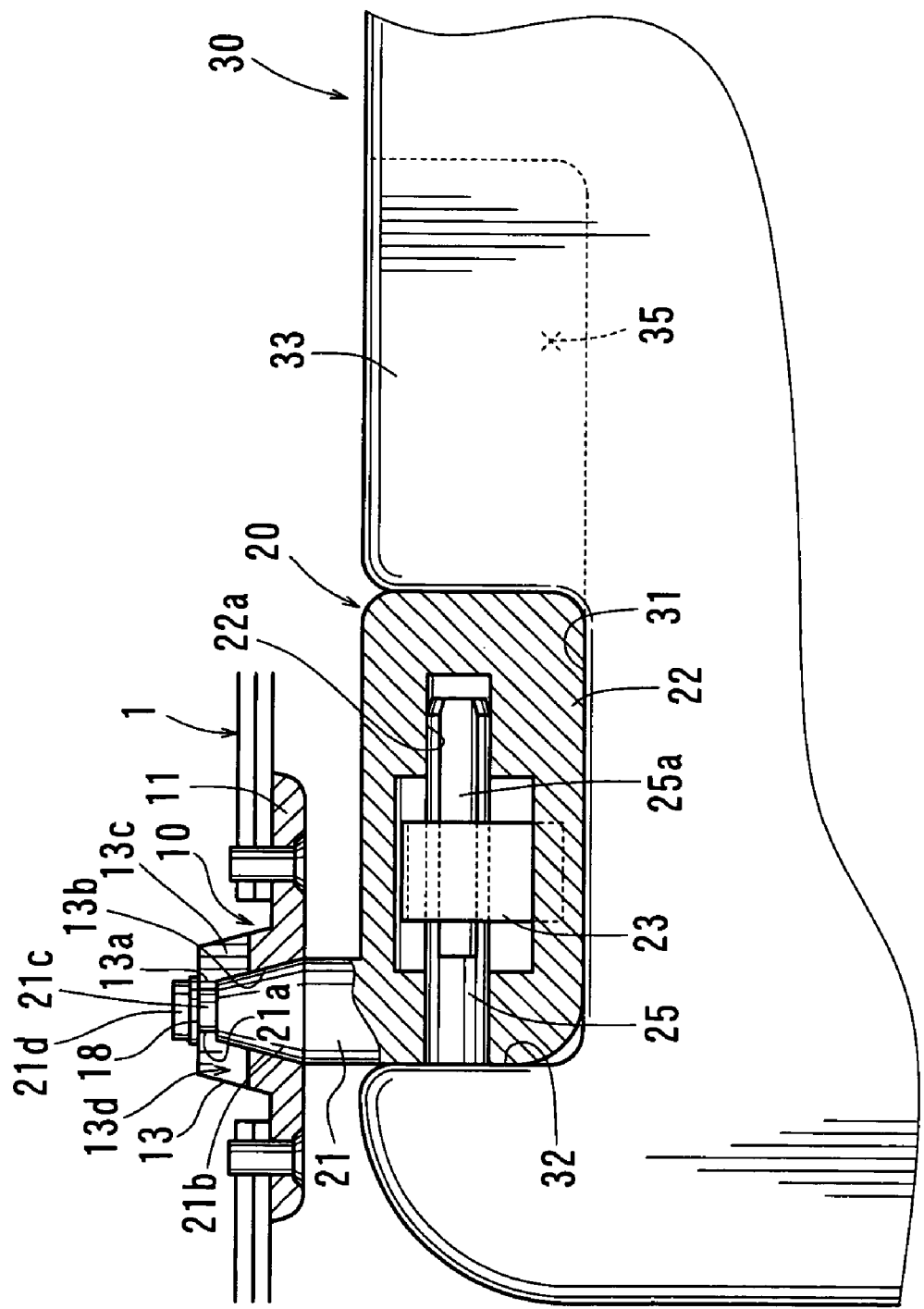
FIG. 2 is a partial side view, with a part broken away, of the components of the first representative vehicle sun visor, and showing the relationship between the vertical rod and the horizontal rod.
Figure 3:
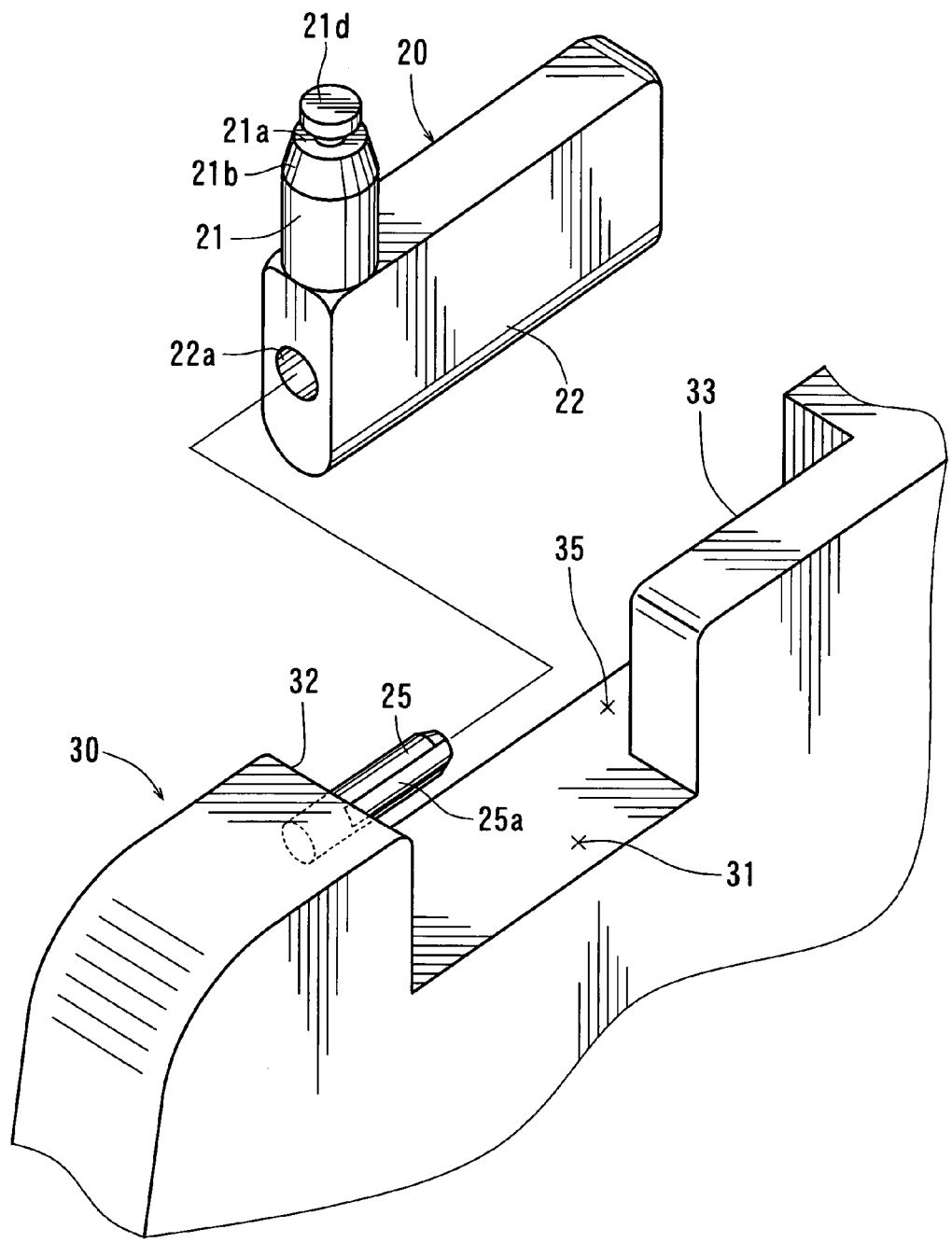
FIG. 3 is an exploded perspective view showing the relationship between the vertical rod and the horizontal rod.

A first representative embodiment will now be described with reference to FIGS. 1 to 3. Referring to FIGS. 1 to 3, a representative vehicle sun visor generally includes a bracket 10, a support arm 20, a vertical rod 21 integrally formed with the support arm 20, a horizontal rod 25, a bearing 22 for rotatably supporting the horizontal rod 25, and a visor body 30.

As shown in FIG. 2, the bracket 10 has a mounting flange 11 and a boss 13. The boss 13 has an upwardly tapered axial hole 13b and extends upward from a substantially central portion of the mounting flange 11. A substantially upper half portion of the boss 13 is split into a plurality of radially deformable portions 13c by a plurality of radial slits 13d. An engaging claw 13a protrudes radially inward from the upper end of each of the radially deformable portions 13c.

Referring to FIGS. 2 and 3, the support arm 20 may preferably be made of synthetic resin. The vertical rod 21 and the bearing 22 are respectively integrally formed with the upper portion and the lower portion of the support arm 20. The vertical rod 21 has a tapered upper portion 21b substantially conforming to the tapered axial bore 13b of the boss 13 of the bracket 10. In addition, a reduced diameter portion 21c with an enlarged head 21d extends upward from the tapered upper portion 21b. The reduced diameter portion 21c defines an annular engaging recess 21a between the enlarged head 21d and the tapered upper portion 21b. Therefore, the engaging claws 13a of the boss 13 can resiliently engage the engaging recess 21a.

As the vertical rod 21 is inserted into the axial bore 13b of the boss 13 of the bracket 10, the enlarged head 21d of the vertical rod 21 contacts with the engaging claws 13a of the boss 13. The engaging claws 13a then resiliently deform radially outward, allowing the enlarged head 21d to pass through the engaging claws 13a. After the enlarged head 21d has passed through the engaging claws 13a, the engaging claws 13a resiliently recover their position and engage with the engaging recess 21a of the vertical rod 21. Therefore, the vertical rod 21 and consequently the support arm 20 may be mounted to the bracket 10 such that the vertical rod 21 is prevented from being moved axially relative to the bracket 10. However, the vertical rod 21 can rotate about the axis of the boss 13. Preferably, a removal prevention ring 18 may be fitted on the reduced diameter portion 21c of the upper end of the vertical rod 21 so as to be positioned between the enlarged head 21d and the upper end surface of the boss 13. With this arrangement, the vertical rod 21 may be more reliably prevented from being removed from the bracket 10.

The bearing 22 is integrally formed with the lower portion of the support arm 20 and has a horizontal bore 22a that receives the horizontal rod 25. If necessary or desired, a clip 23 may be attached to the bearing 22 so as to be positioned within the horizontal bore 22a. The clip 23 may radially resiliently clamp the horizontal rod 25 from opposing sides at a location where chamfered flat portions 25a are formed on opposite sides of the horizontal rod 25. Therefore, the clip 23 may apply a suitable frictional force opposing the rotation of the horizontal rod 25. In addition, the clip 23 may bias the visor body 30 in a direction toward the roof panel 1 of a vehicle cabin ceiling.

In order to position the clip 23 within the horizontal bore 22a, the bearing 22 may be separated into bearing halves in the direction of thickness. Thus, the bearing halves may be assembled into the bearing 22 after the clip 23 has been inserted between the bearing halves. Alternatively, a cutout portion or a recess (not shown) may be formed in the bearing 22 so that the clip 23 may be positioned within the recess.

The visor body 30 may be molded to have a hollow structure by an injection molding process or a blow molding process of a synthetic resin. Alternatively, the visor body 30 may be molded to have a solid structure or a foam structure by a suitable molding process of a synthetic resin or a rubber material. If necessary or desired, the visor body 30 may be covered with a surface cover.

Referring to FIGS. 1 to 3, a substantially U-shaped recess 31 is formed in the upper portion proximal to an upper left corner of the visor body 30. The bearing 22 of the support arm 20 is received within the recess 31, so that the lower portion and the right and left side portions of the bearing 22 respectively oppose to the lower edge and the right and left side edges of the recess 31. In this representative embodiment, the left side edge of the recess 31 may serve as a stopper 32 for preventing the visor body 30 from moving rearward when the visor body 30 is positioned in a side light-shielding position, as will be explained later.

The horizontal rod 25 is integrally formed with the stopper 32 on the left side edge of the recess 31 of the visor body 30 and extends horizontally from the stopper 32. The horizontal rod 25 is rotatably inserted into the horizontal bore 22a formed in the bearing 22 of the support arm 20.

As shown in FIGS. 2 and 3, a wall portion 33 on the right side of the recess 31 of the visor body 30 has a thickness smaller than the remaining portion of the visor body 30. Consequently, a recess 35 is formed on one side of the wall portion 33 in continuity with the recess 31 and opposing the horizontal rod 25. This recess 31 facilitates an operation for inserting the horizontal rod 25 into the horizontal bore 22a of the bearing 22, because the support arm 20 can move within the recess 35 in the axial direction of the horizontal rod 25.

However, when an external force has been applied to the visor body 30 in a rearward direction (from the left direction as viewed in FIG. 2), the bearing 22 of the support arm 20 may contact with the stopper 32 that defines the left side edge of the recess 31. Therefore, the visor body 30 may be prevented from moving in a rearward direction. The inserting direction of the horizontal rod 25 of the visor body 30 into the horizontal bore 22a of the bearing 22 of the support arm 20 is set in the rearward direction (from the left direction as viewed in FIG. 2).

Further, as shown in FIG. 1, an engaging rod 38 is mounted to the visor body 30 in a position adjacent to an upper right corner (as viewed in FIG. 1) on the side of the free end of the visor body 30. The engaging rod 38 has an axis that is aligned with the axis of the horizontal rod 25. The engaging rod 38 can removably and rotatably engage a support hook 39 secured to the roof panel 1.

A curtain-type airbag (not shown) in a folded state may be stored within a side portion of the vehicle cabin ceiling. As is well known, the curtain-type airbag may inflate when an impact force exceeding a predetermined value is applied to the vehicle. The inflated airbag may forcibly open a side end cover of the roof lining and may further extend into the vehicle cabin.

More specifically, when a sensor has detected that an impact force exceeding a predetermined value has been applied to the vehicle, for example, due to a collision with the lateral side of the vehicle, the sensor may output a signal to a gas generator (also known as an inflator), so that the gas generator generates a gas. The generated gas may be charged into the curtain airbag so that the airbag may forcibly open a side end cover of the roof lining and extend into the vehicle cabin. Therefore, the passenger may be protected from the collision force.

According to the first representative vehicle sun visor described above, the visor body 30 may be moved between the storage position along the vehicle cabin ceiling and the front light-shielding position along the front windshield as the visor body 30 pivots about the axis of the horizontal rod 25 relative to the bracket 10 that is mounted to the vehicle cabin ceiling (or the roof panel 1). In addition, the visor body 30 may be moved between the front light-shielding position and the side light-shielding position along the side glass as the visor body 30 pivots about the axis of the vertical rod 21 of the support arm 20.

The visor body 30 in the side light-shielding position is shown in FIGS. 1 and 2 (the side light-shielding position is indicated by solid lines in FIG. 1). When the visor body 30 in the side light-shielding position has received an external force in the rearward direction (a direction to the right in FIGS. 1 and 2), the stopper 32 at the recess 31 of the visor body 30 may contact with the front end (left end as viewed in FIGS. 1 and 2) of the bearing 22 of the support arm 20. Therefore, the visor body 30 may be prevented from being moved rearward. For example, a part of the expansion force of the inflated curtain-type airbag may urge the visor body 30 to the rear.

Therefore, it is possible to reliably hold the horizontal rod 25 of the visor body 30 and the horizontal bore 22*a* of the bearing 22 such that they are fitted to each other. As a result, accidental removal of the visor body 30 from the support arm 20 can be reliably prevented.

In addition, according to the first representative embodiment, the bearing 22 is integrated with the support arm 20 and is fitted into the recess 31 formed in the visor body 30. The horizontal rod 25 cooperating with the bearing 22 is formed integrally with the stopper portion 32 that defines one of the side edges of the recess 31. The visor body 30 can be easily manufactured because it is not necessary to fixedly mount a bearing within the visor body 30.

That is, in order to fixedly mount a bearing within the visor body, it would be necessary for the visor body to be separated into visor body halves so that the bearing may be mounted within the visor body when the visor body halves are coupled to each other. Additionally, the bearing may be formed on one of the visor body halves. As a result, manufacturing the visor body would require troublesome steps.

On the contrary, a typical molding process can be utilized to easily form the horizontal rod 25 with a part of the visor body 30. In addition, the construction of the visor body 30 may be simplified as previously described. Therefore, the manufacturing cost can be reduced considerably.

Second Representative Embodiment

A second representative embodiment will now be described with reference to FIG. 4. The second representative embodiment is a modification of the first representative embodiment. Therefore, like members are given the same reference numbers as the first representative embodiment and the description of these elements will not be repeated.

Figure 4:
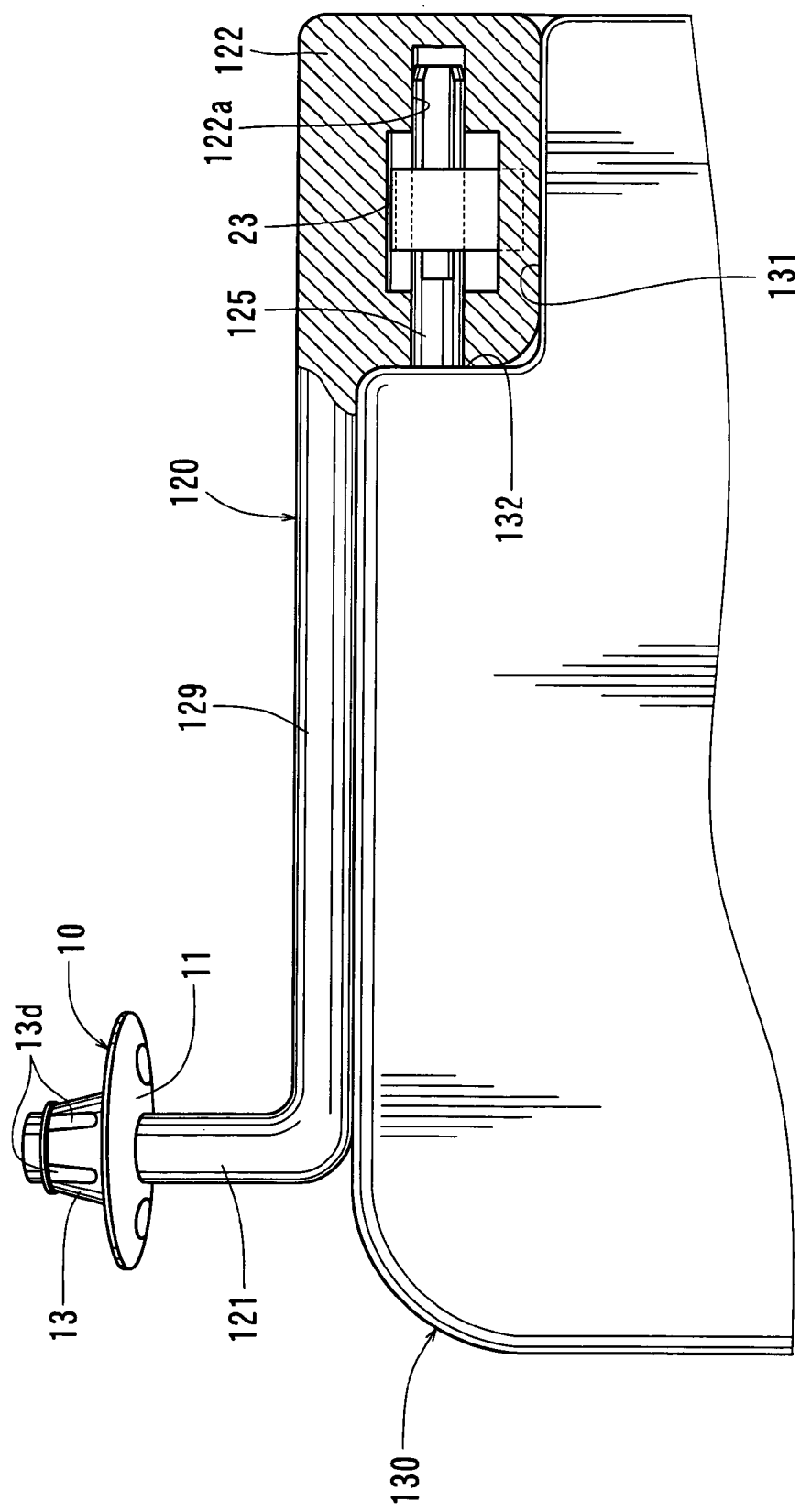
FIG. 4 is a schematic view of a second representative vehicle sun visor showing a visor body in a side light-shielding position.

Referring to FIG. 4, which shows a second representative vehicle sun visor in a side light-shielding position, a support arm 120 is made of synthetic resin and is integrally molded with a vertical rod 121. A horizontal extension 129 is integrally molded with the lower end of the vertical rod 121 and extends along an upper edge of a visor body 130, from a position proximal to the left end of the visor body 130 to a position proximal to the right end of the visor body 130. Further, a bearing 122 is also integrally molded with the right end of the horizontal extension 120.

A cutout portion or a recess 131 is formed in the upper right corner of the visor body 130 in order to receive the bearing 122. The front side edge (the left side edge as viewed in FIG. 4) is configured as a stopper 132 that opposes the bearing 122. Therefore, the visor body 130 is prevented from moving rearward when the visor body 130 is positioned at a side light-shielding position.

A horizontal rod 125 is integrally molded with the stopper 132 and extends horizontally into the recess 131. The horizontal rod 125 is rotatably inserted into a horizontal bore 122*a* formed in the bearing 122.

Also with the arrangement of the second representative embodiment, substantially the same operations and effects as the first representative embodiment can be achieved.

Thus, the stopper 132 may contact with the front end of the bearing 125 when an external force is applied to urge the visor body 130 to the rear, while the visor body 130 is positioned in the side light-shielding position. Therefore, the visor body 130 may be prevented from moving rearward. Therefore, the fitting state between the horizontal rod 125 and the horizontal bore 122*a* of the bearing 122 of the support arm 120 can be reliably maintained. As a result, the visor body 130 can be reliably prevented from being accidentally removed from the support arm 120.

In addition, because the bearing 122 is not fixedly mounted within the visor body 130, the visor body 130 has a simple construction and can be easily manufactured. Still further, the recess 131 is open to the rear side (the side opposite to the stopper 132), the operation for inserting the horizontal rod 125 into the horizontal bore 122*a* of the bearing 122 can be easily performed.

(Possible Modifications of the Embodiments)

In the first and second representative embodiments, the bearing 22 (122) is formed on the support arm 20(120), while the horizontal rod 25 (125) is formed on the visor body 30(130).

However, this arrangement may be reversed such that the horizontal rod 25 (125) is formed on the support arm 20 (120), while the bearing 22 (122) is formed on the visor body 30 (130). In addition, a part of the visor body 30 (130) may be configured as the stopper 32 (132) that may contact with the support arm 20 (120) in order to prevent the visor body 30 (130) from moving rearward when an external force has been applied to the visor body 30 (130) to urge the visor body 30 (130) to the rear. Thus, the inserting direction of the horizontal rod 25 (125) into the horizontal bore 22a (122a) of the bearing 22 (122) may be suitably determined to achieve this operation.

The invention claimed is:

1. A vehicle sun visor comprising:
a visor body;
a bracket arranged and constructed to be mounted to a vehicle cabin ceiling;
a support arm having a vertical rod;
wherein the vertical rod is rotatably mounted to the bracket, so that the support arm can pivot about an axis of the vertical rod;
a horizontal rod disposed on one of the support arm or the visor body;
a bearing disposed on an other of the support arm or the visor body and defining a horizontal bore, so that the horizontal rod is rotatably inserted into the horizontal bore;
wherein the visor body can pivot about an axis of the horizontal rod between a storage position along the vehicle cabin ceiling and a front light-shielding position along a front windshield of a vehicle;
wherein the visor body can pivot about the axis of the vertical rod between the front light-shielding position and a side light-shielding position along a side glass of the vehicle;
a stopper formed on the visor body and arranged and constructed to contact with the support arm in order to prevent the visor body from moving in a removal direction along the axis of the horizontal rod when the visor body is in the side light-shielding position, wherein the removal direction is opposite to a direction for inserting the horizontal rod into the horizontal bore of the bearing;
wherein the bearing is integrally formed with the support arm;
wherein the horizontal rod is integrally formed with the stopper of the visor body and extends substantially horizontally therefrom; and
a first recess formed in the visor body for receiving the bearing,
wherein the first recess is in an exterior surface of the visor body;
wherein the stopper defines a first side edge of the recess; and
wherein the horizontal rod extends from the stopper into the first recess.

2. The vehicle sun visor as in claim 1, wherein the first recess is formed in the visor body throughout the thickness of the visor body.

3. The vehicle sun visor as in claim 2,
wherein the visor body has opposite ends in a longitudinal direction along the horizontal direction and opposite side edges in a direction perpendicular to the horizontal direction.

4. The vehicle sun visor as in claim 3,
wherein the first recess is open at one of the opposite side edges of the visor body in a position proximal to one of the opposite ends.

5. The vehicle sun visor as in claim 4, further comprising a second recess formed in the visor body in continuity with the first recess and opposing to the horizontal rod in the horizontal direction,
wherein the second recess does not extend through the thickness of the visor body.

6. The vehicle sun visor as in claim 3,
wherein the first recess is positioned at a corner portion where one of the opposite ends intersect with one of the side edges, and
wherein the first recess is open at one of the opposite ends and at one of the side edges.

7. The vehicle sun visor as in claim 6,
wherein the support arm further comprises a horizontal extension extending along the one side edge of the visor body and having opposite end portions respectively connected to the vertical rod and the bearing.

8. A vehicle sun visor comprising:
a visor body;
a horizontal rod mounted to the visor body;
a support arm comprising a vertical rod arranged and constructed to be rotatably mounted to a vehicle cabin ceiling:
a bearing mounted to one end of the vertical rod and rotatably receives the horizontal rod, so that the visor body can pivot about an axis of the vertical rod and can also pivot about an axis of the horizontal rod;
a stopper mechanism arranged and constructed to prevent the visor body from moving in a first direction along the axis of the horizontal rod and permit the visor body from moving in a second direction opposite to the first direction;
wherein the first direction is a direction for inserting the horizontal rod of the visor body into the horizontal bore of the bearing;
wherein the stopper mechanism comprises a stopper portion formed on the visor body; and
wherein the horizontal rod extends horizontally from the stopper portion; and
a first recess formed in the visor body for receiving the bearing,
wherein the first recess is in an exterior surface of the visor body;
wherein the stopper defines a first side edge of the first recess; and
wherein the horizontal rod extends from the stopper into the first recess.

9. The vehicle sun visor as in claim 8, wherein the first recess is formed in the visor body throughout the thickness of the visor body.

10. The vehicle sun visor as in claim 9, further comprising a second recess formed in the visor body in continuity with the first recess and opposing the horizontal rod in the horizontal direction, so that the horizontal rod of the visor body can be inserted into the horizontal hole of the bearing as the beating is moved into the first recess via the second recess;
wherein the second recess does not extend through the thickness of the visor body.

11. The vehicle sun visor as in claim 8,
wherein the vertical rod and the bearing are formed integrally with the support arm; and
wherein the horizontal rod is formed integrally with the visor body.

12. A vehicle sun visor comprising:
a visor body;
a visor body rod fixedly mounted to the visor body;
a support arm comprising a support arm rod arranged and constructed to be rotatably mounted to a vehicle cabin ceiling:
a bearing mounted to one end of the support arm rod wherein the bearing is able to rotate about a first axis;

wherein the bearing rotatably receives the visor body rod;
wherein the visor body is able to rotate via the visor body rod about a second axis substantially perpendicular to the first axis;
wherein a first direction is an assembly direction for the bearing to rotatably receive the visor body rod;
a stopper mechanism arranged and constructed to limit movement of the visor body rod in the first direction; and
a bearing recess in the visor body formed across a thickness of the visor body and arranged and constructed to accommodate the bearing;
wherein the stopper mechanism comprises:
a stopper wall abutting the bearing in the first direction;
wherein the stopper wall forms a portion of the recess; and
wherein the visor body rod is fixedly mounted to the visor body at the stopper wall.

13. The vehicle sun visor as in claim 12 further comprising:
an assembly recess in the visor body adjacent to the bearing recess and formed partially across the thickness of the visor body;
wherein the assembly recess is positioned across horn the visor body rod in a second direction, opposite to the first direction.

14. The vehicle sun visor as in claim 12 wherein the bearing further comprises:
a clip resiliently interfacing with the visor body rod;
wherein the visor body rod as at least one planar surface of the visor body rod parallel to a visor body rod axis; and
wherein a force biases the visor body against the vehicle cabin ceiling due to the resilient interface between the clip and the at least one planar surface of the visor body rod.

15. The vehicle sun visor as in claim 14;
wherein the bearing comprises:
a first bearing half; and
a second bearing half;
wherein the clip is located between the first bearing half and the second bearing half.

* * * * *